April 28, 1931.  J. M. WALTMAN ET AL  1,803,224
DEVICE FOR MEASURING THE SPEED OF VEHICLES
Filed Nov. 13, 1928    2 Sheets-Sheet 1
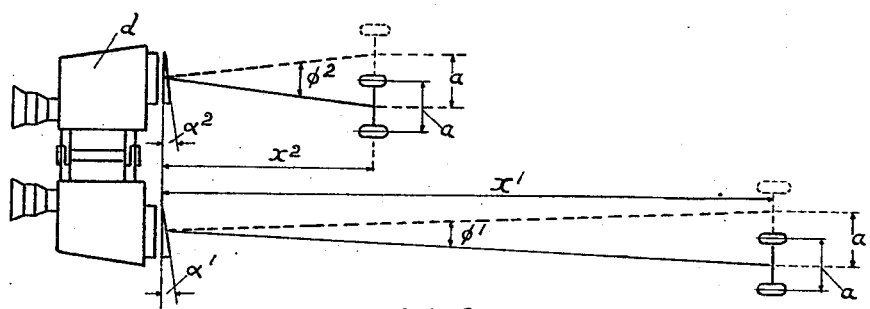
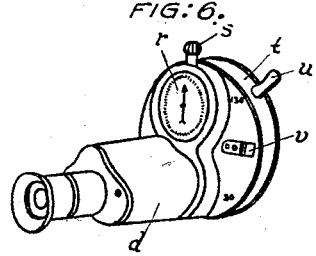
J. M. Waltman &
J. F. Sirks
INVENTOR
By: Marks & Clerk
Attys.

April 28, 1931. J. M. WALTMAN ET AL 1,803,224
DEVICE FOR MEASURING THE SPEED OF VEHICLES
Filed Nov. 13, 1928 2 Sheets-Sheet 2
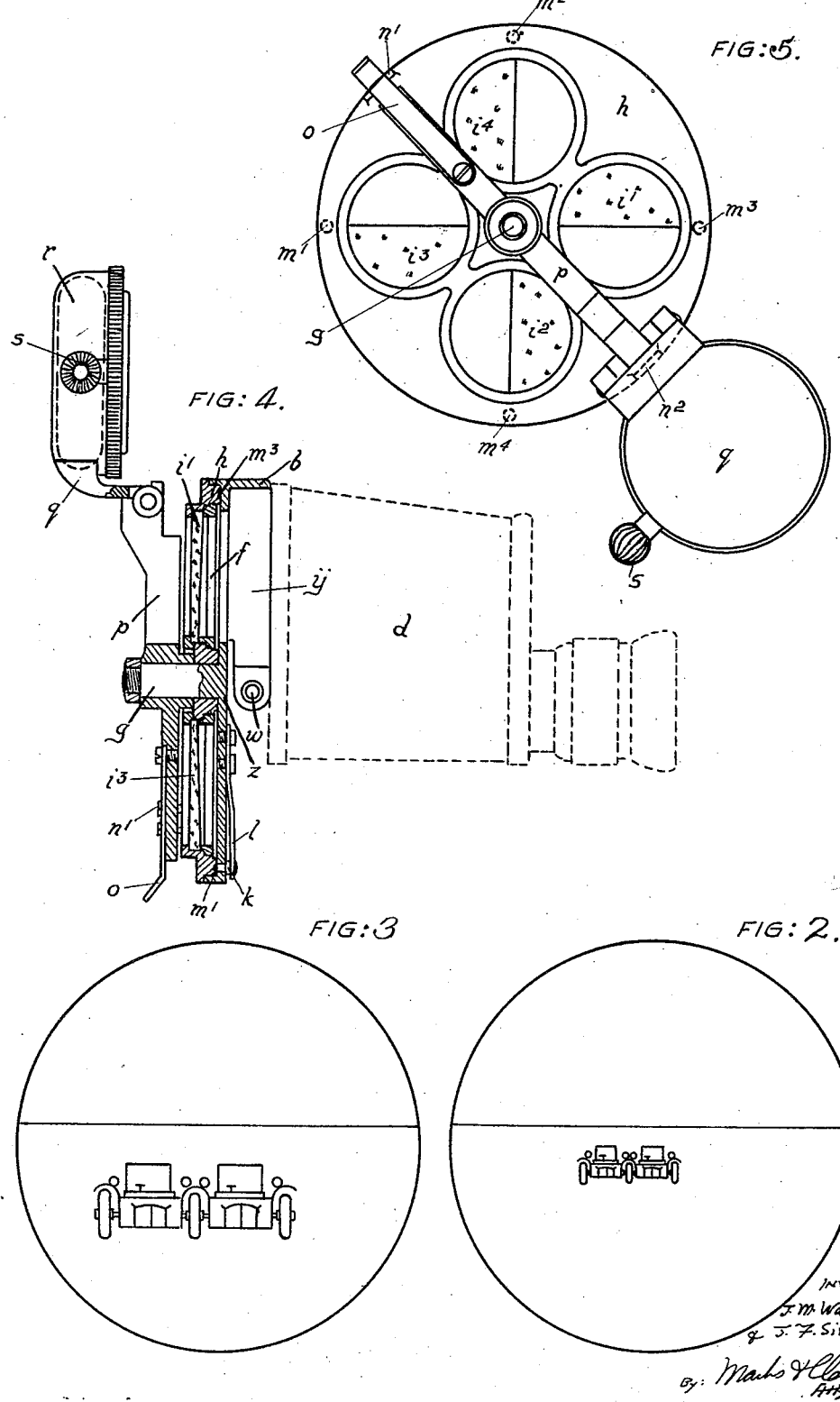

Patented Apr. 28, 1931

1,803,224

UNITED STATES PATENT OFFICE

JOHANNES MARTINUS WALTMAN, OF THE HAGUE, AND JAN FREDERIK SIRKS, OF VOORSCHOTEN, NETHERLANDS

DEVICE FOR MEASURING THE SPEED OF VEHICLES

Application filed November 13, 1928, Serial No. 319,114, and in Germany November 18, 1927.

The present invention relates to means for measuring the speed of vehicles moving along a straight path, particularly the speed of motor cars.

It is of special advantage to construct the improved device in such a way that the deflecting means consist of two prisms having a different refractive angle and covering each approximately half the cross section of the rays of the single telescopes. Furthermore it is advisable to render the deflecting means attachable to the oculars or the objectives of the double telescope so as to be able to also use the latter without the device, if necessary.

As a length, which with the different types of motor cars is substantially the same and therefore particularly suitable as a basis for carrying out the measurement of the speed, there comes in the first place into question the track, at dusk preferably the distance of the headlights. As the same lie in the horizontal line it is suitable to provide the double telescope with guides which admit of attaching the prisms in such a way that, when using the device, the refractive edges are in approximately vertical position, the displacement of the image then being horizontal. When using attachable Iceland spar splats and the like it is, of course, also advisable to provide the device with a corresponding guiding appliance.

The object of the present invention is to enable the improved device to be applied to a monocular telescope thus reducing the total cost of the instrument and providing one which is suited for those who are accustomed to use one eye only.

According to this invention the refracting prisms are mounted on a changing device whereby they may be brought, in succession, in front of the objective of a monocular telescope.

A further feature of the present invention is the combination, with the changing device, of a stop watch so that the action of starting the watch may serve also to actuate the changing device.

It is desirable that the distance covered by a vehicle between the two observations should always be the same and the refractive indices of the prisms should be chosen so that, with a definite unit of measurement, (such as the wheel-track of a vehicle) the first observation (i. e. when the stop watch will be started) will take place when the vehicle is at one predetermined point and the second observation (i. e. when the stop watch will be stopped) when the vehicle is at a second predetermined point at a convenient distance from the observer. If however, that unit of measurement be changed, calculations become necessary, or, alternatively, prisms of different refractive indices must be employed. If, for example, it is desired to use the device for checking the speed of motor cars, it is inevitable that, if the wheel-track gauge be adopted as the most suitable unit of measurement for observations by day, a second unit of measurement must be taken for night observations and the distance between the headlights may be taken as the basis.

In order to save calculations, a second pair of prisms can be provided on the changing device so that, alternatively, said second pair can be brought in front of the objective, their effect being different from that of the first pair, and such that the distance limits (i. e. beginning and end) of the test will be the same for the second unit of measurement.

The device will be particularly complete if the stop watch be adapted to be coupled, in two positions, with the changing device, in such a manner that, on being set in one position, it effects the changing of the one pair of deflecting means, and, in the other position effects the changing of the other pair.

In the accompanying drawings some embodiments of the invention are illustrated.

Fig. 1 shows diagrammatically in a plan view the operation of the device when in use, the full lines indicating the real position of a car, the dotted lines, however, indicating the position effected by the deflection.

Fig. 2 shows the double image observed in the right telescope at the moment at which the car is on the distance $x^1$, whereas Fig. 3 shows the double image observed in the left telescope at the moment at which the car is on the distance $x^2$.

An embodiment of the invention is illustrated in Fig. 4 as a diagrammatically median section and in Fig. 5 as a plan. To make the illustration clear, the lever carrying the stop watch, in Fig. 4 is misplaced by 45°, as compared with the position shown in Fig. 5. Fig. 6 represents a modification of the device in perspective and on a smaller scale.

How the measurement of speeds is carried out may be seen from the following example. On a straight road there is located an observer, who is provided with both a stop watch and a telescope $d$ to which the device is fitted, the refractive angle $\alpha 2$ of the prism $i^2$ amounting to 3° (displacement of the image $\phi = 1° 38'$) and the refractive angle $\alpha 1$ of the prism $i^1$ to 1° (displacement of the image $\phi = 31'$).

If the observer on the road be approached by a motor car, whose track $a = 1,35$ m. is known, the double images of the car wheels, perceived by the single telescope fitted with the prism $i^1$ will appear to be just displaced in horizontal direction by the wheel base as if the distance of the car from the observer be according to the Equation 1.

$$x^1 = \frac{1,35}{31} \cdot \frac{360.60}{2\pi} = 149,7 \text{ m.}$$

and the double images perceived with the other single telescope if $$x^2 = \frac{1,35}{98} \cdot \frac{360.60}{2\pi} = 47,4 \text{ m.}$$

In the same way the measurement of the distance may be carried out on the car receding from the observer. The measurement of time with the stop watch, which is set going at the period of the distance $x^1$ and stopped at the period of the distance $x^2$, may yield.

$$t = 18 \text{ sec.}$$

wherefrom results the speed $v$ of the car according to the Equation 2.

$$v = \frac{149.7 - 47.4}{18} \cdot \frac{60.60}{1000} = 20,4 \frac{\text{km.}}{\text{hour}}$$

When measuring the speed of an approaching car the observer looks at first only through the right telescope till he observes the image shown in Fig. 2. At this moment the movement of the stop watch is started. Thereupon he only looks through the left telescope till he observes the image shown in Fig. 3, at which moment the movement of the stop watch is stopped. The speed of the car can then be determined in the manner already indicated.

In Figs. 4 and 5 the device is shown in position on a monocular field glass $d$ and is provided with a clamping ring $b$ and clamping screw $w$, by means of which it can be attached to the mount $y$ of the objective of the field glass $d$. The clamping ring $b$ is cast integrally with a disc $z$ which is provided with a circular opening $f$ coaxial with the clamping ring $b$. The disc $z$ carries a pin $g$ serving as a pivot for a rotatable disc $h$ which is provided with four semicircular prisms $i^1$, $i^2$, $i^3$ and $i^4$, having the angles of refraction $\alpha 1$, $\alpha 2$, $\alpha 3$ and $\alpha 4$. A spring $l$, mounted on the disc $z$ and provided with a catch pin $k$ forms, in conjunction with four corresponding depressions $m^1$, $m^2$, $m^3$ and $m^4$, in the rotatable disc $h$ latching means for locating any one of the prisms $i^1$, $i^2$, $i^3$ and $i^4$, in the correct position, for the time being, in front of the mount $d$ of the objective. A lever $p$ which is also rotatable on the pivot $g$, is adapted to be coupled with the rotatable disc $h$ by means of a leaf spring $o$ and two pairs of lugs $n^1$ and $n^2$, situated at 180° to one another. Hinged on this lever $p$ is a watch casing $q$, serving to house a stop watch $r$, the movement of which can be started and stopped by means of a switch knob $s$ projecting from the casing $q$. In the position shown, the casing $q$ is ready for use; whilst, for packing, the casing $q$ can be folded back on to the instrument through a right angle.

For example, it is assumed that determinations are to be made of the speed of motor cars approaching the observer on a straight road and over a stretch beginning 130 and ending 30 metres away. The prisms $i^1$ and $i^2$ are chosen for daylight measurement, with the wheel-track gauge as the unit of measurement; and the prisms $i^3$ and $i^4$ for measurements in the dark, with the distance between the head lights as the unit. The angles of refraction of the prisms have been determined as follows, for certain kinds of glass and the usual length of measuring stretch:—

$\alpha 1 = 38' 30''$    $\alpha 3 = 26' 30''$
$\alpha 2 = 2° 46' 0''$    $\alpha 4 = 1° 54' 30''$ For daylight measurement the spring $o$ must be arranged between the lugs $n^1$, so that the stop watch lever $p$ lies between the prisms $i^1$ and $i^2$. The prism $i^1$ is set in front of the mount $d$ of the objective and the observation of an approaching vehicle through the field glass $a$ displays a dual image as above set forth. At the moment of passing the 130 m. limit, the displacement of the halves of the duel image corresponds with the dimensions of the wheel-track gauge. At this moment the observer starts the stop watch $r$ by pressing the knob $s$, the pressure so exerted turning the casing $q$ and the rotatable disc $h$ coupled thereto through 90° about the pivot $g$, thereby bringing the prism $i^2$ in front of the mount $y$ of the objective. Owing to the value of the calculated angle $\alpha 2$, the displacement of the image through a distance corresponding with the unit of measurement occurs at the second limit of distance, i. e. the 30 m. limit, and the watch $r$ is stopped by pressing the knob $s$. The time indicated by the watch as consumed in travelling through the distance 130—30=100 metres gives, when multiplied by 10, the time taken by the car in travelling 1 kilometre.

For night work, with the distance between the headlights as the unit of measurement, the same procedure is followed, but the spring $o$ must be located between the lugs $n^2$ and, correspondingly, the prisms $i^3$ and $i^4$ used in place of the prisms $i^1$ and $i^2$. Obviously, the changing device may be duplicated for binocular telescopes or a single changing device may carry eight prisms.

Since various motor car makers turn out their products with wheel-track gauges and headlight spacing which differ from the normal, it will be a convenient practice to provide the observer with a table from which, with the aid of the measured time, he can read off the speed of such cars without having to make calculations.

In contrast to the embodiment shown in Figure 4, the stop watch $r$ in the embodiment according to Figure 6 is fixed on to the casing $t$ in which the prisms $i^1$—$i^4$ are housed, whilst a lever $u$, projecting from the casing, is mounted on the rotatable disc and serves for changing the prisms. The drawing shows only one lever $u$, which is used for measuring in daylight. Diametrically opposite to this lever is a similar lever which takes the place of the lever $u$ for measuring in the dark, this being accomplished by turning the rotatable disc through 180°. On the prism casing is a small spring-controlled slide $v$, by means of which the rotatable disc is fixed with the prisms for daylight and night observation.

What we claim is:

1. In an apparatus for measuring the speed of vehicles moving in a straight line the combination of a telescope with two refracting prisms to be interposed within the path of the rays of the telescope and with a stop watch, the refracting prisms having a different refractive angle being adapted to cover each approximately half the cross section of the rays of the telescope, and a changing device on which the prisms and stop watch are operatively mounted whereby they may be brought in succession in front of the objective of the telescope.

2. In an apparatus for measuring the speed of vehicles moving in a straight line the combination of a telescope with two refracting prisms to be interposed within the path of the rays of the telescope and with a stop watch, the refracting prisms having a different refractive angle, being adapted to cover each approximately half the cross section of the rays of the telescope, a changing device on which the prisms and the stop watch are operably mounted whereby they may be brought in succession, in front of the objective of the telescope, the stop watch being connected with the changing device in such a manner that starting the stop watch can simultaneously effect the changing of the refracting prisms.

In testimony whereof we affix our signatures.

JOHANNES MARTINUS WALTMAN.
JAN FREDERIK SIRKS.